US005547500A

United States Patent [19]

Tsutsui

[11] Patent Number: 5,547,500

[45] Date of Patent: Aug. 20, 1996

[54] REVERSIBLE THERMAL COLORING COMPOSITIONS, AND RECORDING MEDIA AND METHODS USING THE SAME

[75] Inventor: Kyohji Tsutsui, Mishima, Japan

[73] Assignee: Ricoh Company, Ltd., Tokyo, Japan

[21] Appl. No.: 409,681

[22] Filed: Mar. 23, 1995

[30] Foreign Application Priority Data

Mar. 24, 1994 [JP] Japan .................................... 6-078082
Mar. 14, 1995 [JP] Japan .................................... 7-081677

[51] Int. Cl.$^6$ .................................................... C09D 11/00

[52] U.S. Cl. ........................ 106/21 A; 106/21 R; 503/201

[58] Field of Search ................................ 106/21 A, 21 R; 503/201

[56] References Cited

U.S. PATENT DOCUMENTS

| | | | |
|---|---|---|---|
| 4,685,648 | 9/1989 | Kito et al. | 106/21 A |
| 4,720,301 | 1/1988 | Kito et al. | 106/21 A |
| 5,178,669 | 1/1993 | Watanabe et al. | 106/21 R |
| 5,185,194 | 2/1993 | Miyake et al. | 428/64 |
| 5,296,439 | 3/1994 | Maruyama et al. | 503/201 |
| 5,376,616 | 12/1994 | Hamano et al. | 106/21 R |
| 5,380,693 | 1/1995 | Goto et al. | 503/200 |
| 5,395,433 | 3/1995 | Maruyama et al. | 106/21 A |
| 5,403,810 | 4/1995 | Sawamura et al. | 503/201 |

FOREIGN PATENT DOCUMENTS

| | | |
|---|---|---|
| 50-81157 | 7/1975 | Japan . |
| 50-105555 | 8/1975 | Japan . |
| 60-193691 | 10/1985 | Japan . |
| 61-237684 | 10/1986 | Japan . |
| 62-140881 | 6/1987 | Japan . |
| 62-138568 | 6/1987 | Japan . |
| 62-138556 | 6/1987 | Japan . |
| 2-188294 | 7/1990 | Japan . |
| 2-188293 | 7/1990 | Japan . |
| 4-46986 | 2/1992 | Japan . |
| 4-50289 | 2/1992 | Japan . |
| 4-50290 | 2/1992 | Japan . |
| 5-262032 | 3/1992 | Japan . |
| 5-92661 | 4/1993 | Japan . |
| 5-124360 | 5/1993 | Japan . |
| 5-177931 | 7/1993 | Japan . |
| 6-48028 | 2/1994 | Japan . |

*Primary Examiner*—Helene Klemanski
*Attorney, Agent, or Firm*—Oblon, Spivak, McClelland, Maier & Neustadt, P.C.

[57] ABSTRACT

The reversible thermal coloring composition of the present invention comprises a leuco compound, a salt or complex salt obtained by the reaction of an acidic substance A and a basic substance, and an acidic substance B. The acidic substance A is identical with the acidic substance B.

8 Claims, 2 Drawing Sheets

REVERSIBLE THERMAL COLORING COMPOSITIONS, AND RECORDING MEDIA AND METHODS USING THE SAME

BACKGROUND OF THE INVENTION

The invention relates to a reversible thermal coloring composition that can be freely colored and decolored by thermal energy, a recording medium comprising said composition and a method for recording using said composition.

Thermal recording paper is widely used in a word processor and a facsimile machine. Nowadays, used thermal recording paper is not regenerated but always discarded on account of technological and economic limitations for regeneration.

Recently, thermal recording paper which can be reversibly used is desired on account of rapid increase of the amount of waste in a city and the need for preservation of environment and natural resource.

Several materials which can be thermally colored and decolored have been proposed. For example, JP-A-50-81157 and JP-A-50-105555 disclose materials comprising a leuco compound, a phenol compound and a higher alcohol. However, the color of the materials changes depending on temperatures and both of the colored and decolored states of the materials can not be fixed at ordinary temperature.

JP-A-60-193691 discloses a material wherein a leuco dye is combined with phloroglucinol. This material is colored by heat but a recording medium comprising the material is impractical since water or steam is used to decolor the colored material.

JP-A-61-237684 discloses a material wherein a leuco compound is combined with a compound such as phenolphthalein or thymolphthalein. Colored state of the material is obtained by heating and subsequent slow cooling of the material. The decolored state of the material is obtained by heating the colored material at a temperature higher than the coloring temperature of the material and subsequently rapidly cooling. However, an image having a high contrast cannot be obtained by use of a recording medium comprising the material since the material cannot be sufficiently decolored by heating and cooling.

JP-A-62-140881, JP-A-62-138568 and JP-A-62-138556 disclose a composition comprising a leuco compound, a phenol compound and a carboxylic acid ester. This composition maintains a colored state at a lower temperature and a decolored state at a higher temperature and is in a colored or decolored state at an intermediate temperature. However, a recording medium comprising this material is also impractical in that such recording medium must be kept at a specific temperature for preserving the image recorded thereon.

While, JP-A-2-188294, JP-A-2-188293, JP-A-4-46986, JP-A-4-50289, JP-A-4-50290, JP-A-5-177931, JP-A-5-92661 and JP-A-5-262032 disclose and a color-developing and decoloring agent having both color-developing and decoloring actions. Said color-developing and decoloring agent includes amphoteric compounds having acid group(s) and basic group(s) such as aminophenols, aminobenzoic acids and hydroxyaminobenzoic acids; or salts or complex salts formed from acidic substances such as gallic acid, bishydroxyphenylacetic acid and bishydroxyphenylbutyric acid and basic substances such as aliphatic and aromatic amines.

Particularly, JP-A-2-188294 discloses a composition comprising a leuco compound and the above salt or complex salt. These salts and complex salts are obtained by a reaction of said acidic substance with an equivalent amount of said basic substance.

Said amphoteric compounds and said salts or complex salts of the above prior arts have both the functions of a color-developer and a decoloring agent. Therefore, in these systems, both coloring and decoloring reactions proceed simultaneously in a molten and mixed state. However, the coloring reaction proceeds faster than the decoloring reaction. Consequently, said compositions are thought to be colored by heating for a short time, and to be decolored and equilibrated when being heated for a long time and kept molten. This decolored state is maintained after said compositions are cooled.

However, on account of the above coloring and decoloring processes, a recording medium comprising any of said compositions has a problem that it has a difficulty in controlling thermally its coloring and decoloring processes and a problem of reducing in color density with time. Further, said medium is colored by rapid cooling. Therefore, only a positive colored image in which the areas corresponding to an image such as a printed letter are colored can be obtained and a negative image in which the background is colored and the areas corresponding to an image such as a printed letter are decolored can be hardly formed on said recording medium, in a common image forming process wherein a thermal head is used.

The present inventors previously proposed a reversible coloring composition comprising a leuco compound and a developer having a long alkyl chain (JP-A-5-124360) to solve the problems of the above recording materials. A recording medium comprising this composition exhibits excellent coloring stability and decoloring properties. However, it has a problem that its decoloring is slightly slower than its coloring. In addition, this medium is colored by rapid cooling and only a positive image is formed on this medium but a negative image is hardly formed.

Additionally, a reversible recording medium in which a leuco compound, a developer which is an acidic substance, and a complex salt of an acid and an amine is disclosed with JP-A-6-48028. In this recording medium, a compound which is different from the developer is used as the acidic substance forming the complex salt with the amine. Like the above recording medium of JP-A-2-188294 using a complex salt, this recording medium is colored by short time-heating and rapid cooling, and is decolored by long time-heating and slow cooling or by heating to a lower temperature. Therefore, only a positive image can be formed but no negative image is obtained.

In the conventional reversible thermal coloring composition comprising a colorless leuco compound, an acidic substance and a basic substance, the lactone ring of the leuco compound is cleaved by the acidic substance of the composition and the leuco compound is brought into a colored state. The lactone ring of the colored leuco compound is again formed by the action of the basic substance of the composition and the leuco compound returns to colorless.

In short, the acidic substance acts as a developer of the leuco compound and the basic substance acts as a decoloring agent.

In the conventional thermal coloring composition as disclosed with JP-A-2-188294, wherein an amphoteric compound or a salt or complex salt of an acidic substance and a basic substance acting as both a developer and a decoloring agent is incorporated, both coloring and decoloring reactions proceed simultaneously when said composition is heated to melt and mix. However, said composition is thought to be colored when being heated for a short time since the coloring reaction proceeds faster than the decoloring reaction. While, said composition reaches to an equilibrium wherein said composition is in the decolored state when being heated for a long time and left melted. The decolored state is maintained even after being cooled.

The present inventors thought that among the above phenomena, not only the difference in the reaction rate between the coloring and decoloring reactions but also the colored state being to be fixed at room temperature are essential. In other words, the inventors thought that attention should be paid to its solid state, that is, the structure of arranged molecules and its change with the temperature at which the composition is heated.

The inventors have found that an entirely different phenomenon from the previously known ones occurs when an acidic substance having a specific structure is combined with a specific basic substance in a specific ratio. The inventors have further found that the most essential factor is that both the acidic and basic substances have a long chain structure which cause the formation of a structure of arranged molecules and the change thereof and that the acidic and basic substances are incorporated in a specific amount ratio.

The inventors have reached the present invention on the basis of the above findings.

SUMMARY OF THE INVENTION

The object of the present invention is to solve the above problems of a conventional reversible thermal coloring composition using a coloring reaction of a leuco compound and provide a composition which can be easily colored and decolored only by heat, be maintained stably in its colored and decolored states at ordinary temperature, and further be rapidly colored and decolored. Additionally, another object of the present invention is to provide a reversible thermal recording medium wherein good colored and decolored states can be repeatedly and stably formed and a negative image can be formed, and a recording process by using the recording medium.

The present invention relates to a reversible thermal coloring composition comprising a leuco compound, a salt or complex salt of an acidic substance A and a basic substance and an acidic substance B, characterized in that the acidic substance A is identical with the acidic substance B.

The present invention also relates to a recording medium having a recording layer on a support wherein the recording layer comprises said reversible thermal coloring composition and a binder resin.

Further, the present invention relates to a method for reversible recording comprising a coloring step wherein said recording medium is heated at a temperature within the range of the coloring temperature of said coloring composition which is lower than the decoloring temperature range of said coloring composition, and a decoloring step wherein the recording medium is heated at a temperature which is higher than the coloring temperature of said coloring composition.

DETAILED DESCRIPTION OF THE INVENTION

It is the most important feature of the composition of the present invention that an acidic substance which is identical with the acidic substance used for forming said salt or complex salt is further incorporated. Owing to this feature, a phenomenon which is characteristic of the coloring composition and recording medium of the present invention takes place, i.e. said coloring composition and recording medium is decolored by heating at a higher temperature and colored by heating at a lower temperature, contrary to conventional recording media. The coloring composition of the present invention is obtained by incorporating an excess amount, i.e., more than the equivalent amount of the acidic substance for forming said complex salt from said acidic and basic substances when mixing each of the components constituting said coloring composition (leuco compound, acidic substance and basic substance). Alternatively, said salt or complex salt can be formed previously and subsequently, an additional amount of the acidic substance is added.

The coloring and decoloring processes characteristic of the composition of the present invention will be described in detail herein below.

A composition in an initial state comprising a leuco compound, a basic substance and an acidic substance, all of which are in solid state at room temperature, wherein the amount of the acidic substance is in excess of that required for forming a salt or complex salt with the basic substance, is in a decolored state. Said composition is also in the decolored state while being heated to melt. In said composition which is in the molten state, the basic substance performs decoloring action in spite of the excess amount of said acidic substance present. Further, the decolored state is maintained while said composition is cooled from the molten state to room temperature. Then, while heated again from room temperature, said composition is suddenly colored at a temperature lower than the melting temperature thereof. This coloring process is believed to be caused by the change of the state other than the melting process and particularly, it may be assumed that some change in the structure of the arranged molecules due to long alkyl chains of said acidic and basic substances may be involved in said coloring process. The colored state is fixed at room temperature by cooling said composition from the coloring temperature. The color density of the heated composition is not always same as the color density at room temperature. For example, the composition may be in an almost decolored state at a temperature slightly lower than the melting temperature and be colored during the cooling process. Said composition which is in the colored state can be brought back to the decolored state by heating at a temperature higher than the melting temperature followed by cooling.

Figure 1:
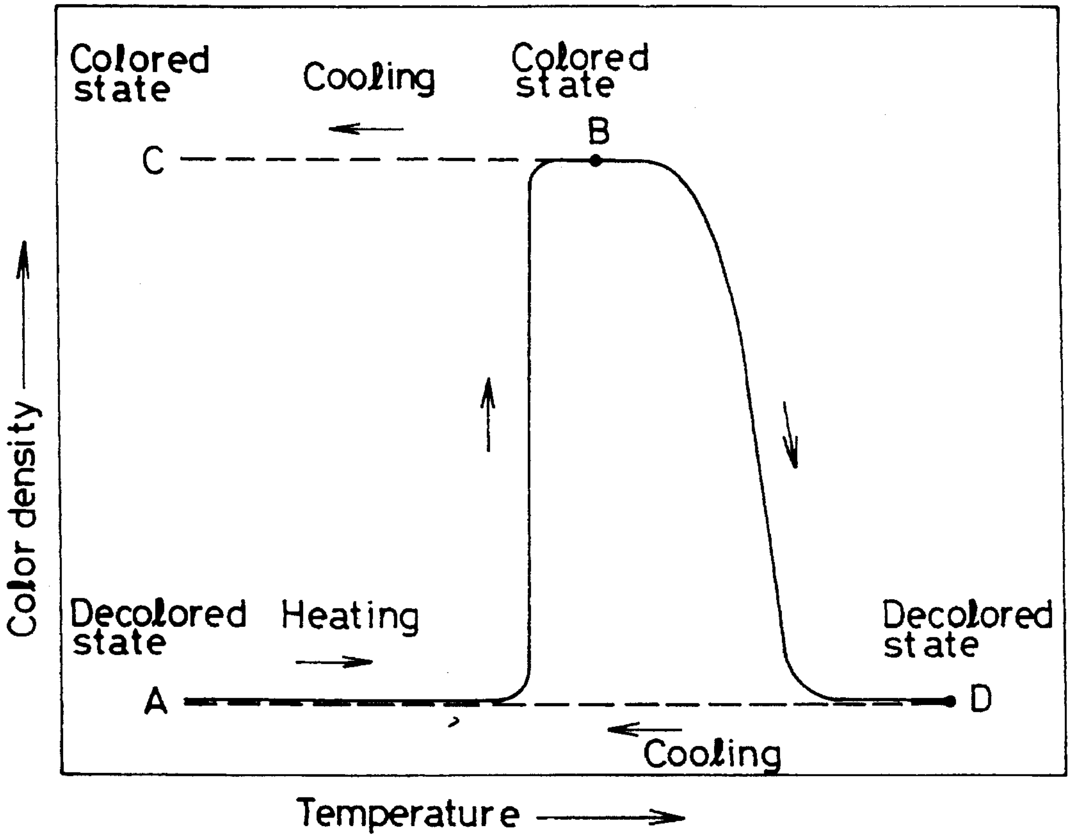
FIG. 1 is a diagram showing the coloring and decoloring processes of the reversible thermal coloring composition according to the invention.

Consequently, the coloring and decoloring processes of the reversible coloring composition of the present invention can be summarized as shown in FIG. 1. Upon heating said composition which is in the decolored state A to bring it to the colored state B and then cooling said composition, the colored state C of said composition is obtained. Said composition in the colored state C is brought to the decolored state D upon heating it to its molten state and then returns to the decolored state A upon cooling. A recording medium comprising said composition allows repeated recording and erasing operation through the coloring and decoloring cycle.

As stated above, the composition of the present invention can be freely and repeatedly brought into either the colored or decolored state by changing the heating temperature. In addition, the coloring temperature range is clearly separated from the decoloring temperature range and the former range is lower than the latter range. Both the colored state and the decolored state can be obtained by heating said composition to said temperature ranges and subsequently cooling. The composition of the present invention has an important characteristic, which could not attained by the prior art, in that said composition can be sufficiently decolored only by short time heating and subsequent rapid cooling.

The substances which can be used in the present invention are described in the following.

The acidic substance which can color (i.e., induce the color-development of) a leuco compound and can be used in the present invention includes compounds having an acid group such as a carboxylic, phosphoric, phosphonic or phenolic hydroxyl group in the molecule. Particularly, a polybasic acid having two or more carboxyl groups in its molecule is preferred. Further, the acidic substance preferably has an alkyl group having 10 or more carbon atoms for maintaining firmly both the colored and decolored states of the coloring composition of the present invention. The acidic substance includes the compounds represented by the following formula (1):

$$R_1-X_n-\underset{\substack{|\\ CH_2-COOH}}{CH}-COOH \qquad (1)$$

wherein $R_1$ denotes an alkyl group having 10 or more carbon atoms, X denotes an oxygen or sulfur atom and n is 1 or 2.

The compounds represented by the general formula (1) includes decyl Emalic acid, dodecyl malic acid, tetradecyl malic acid, hexadecyl malic acid, octadecyl malic acid, eicosyl malic acid, docosyl malic acid, tetracosyl malic acid, decyl thiomalic acid, dodecyl thiomalic acid, tetradecyl thiomalic acid, hexadecyl thiomalic acid, octadecyl thiomalic acid, eicosyl thiomalic acid, docosyl thiomalic acid, tetracosyl thiomalic acid, decyl dithiomalic acid, dodecyl dithiomalic acid, tetradecyl dithiomalic acid, hexadecyl dithiomalic acid, octadecyl dithiomalic acid, eicosyl dithiomalic acid and tetracosyl dithiomalic acid.

The basic substance usable in the present invention is a compound having in its molecule a basic group which can decolor a colored leuco compound. The basic group typically includes an amino group. The basic substance also preferably has an alkyl group having 10 or more carbon atoms for maintaining firmly both the colored and decolored states of the coloring composition.

Such basic substance includes primary, secondary and tertiary amines optionally substituted by one or more substituents. Illustratively, the basic substance includes compounds such as:

decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, didecyl amine, didodecyl amine, ditetradecyl amine, dihexadecyl amine, dioctadecyl amine, dieicosyl amine, N-methylhexadecyl amine, N-methyloctadecyl amine, N-ethyloctadecyl amine, tritetradecyl amine, trihexadecyl amine, trioctadecyl amine, dimethyldodecyl amine, dimethyltetradecyl amine, dimethylhexadecyl amine, dimethyloctadecyl amine, methyldioctadecyl amine, 2-octadecyloxyethylamine, and 2-octadecylthioxyethylamine.

The leuco compound used in the coloring composition of the present invention is not limited to specific leuco compounds but includes any conventional leuco compounds. Such leuco compounds include triphenylmethanephthalide compounds, fluoran-type compounds, phenothiazine-type compounds, leucoauramine-type compounds and indolinophthalide compounds.

The preferable leuco compound usable in the present invention includes the leuco compounds represented by the following general formula (2) or (3):

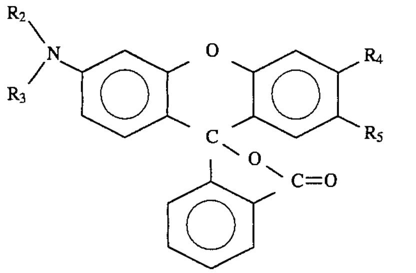

(2)

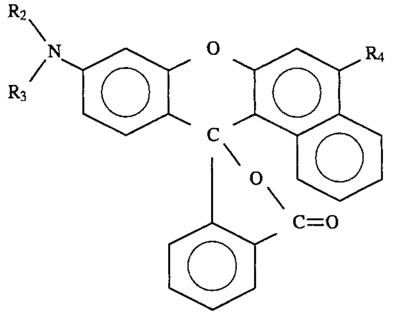

(3)

wherein $R_2$ denotes a hydrogen atom or an alkyl group having 1 to 4 carbon atoms and $R_3$ denotes an alkyl group having 1 to 6 carbon atoms, a cyclohexyl group or a phenyl group that can be substituted. The substituent that can be attached to the phenyl ring includes an alkyl group such as methyl or ethyl group, an alkoxy group such as methoxy group or ethoxy group and a halogen atom. $R_4$ denotes a hydrogen atom, an alkyl group having 1 or 2 carbon atoms, an alkoxy group or a halogen atom. $R_5$ denotes a hydrogen atom, a methyl group, a halogen atom, or an amino group that can be substituted. The substituent that can be attached to said amino group includes, for example, an alkyl group, an aryl group that can be substituted and an aralkyl group that can be substituted. The possible substituent of the aryl or aralkyl group includes an alkyl group, a halogen atom or an alkoxy group.

The following compounds can be stated as an example of said leuco compounds:

2-anilino-3-methyl-6-diethylaminofluoran;

2-anilino-3-methyl-6-(di-n-butylamino)fluoran;

2-anilino-3-methyl-6-(N-n-propyl-N-methylamino)fluoran;

2-anilino-3-methyl-6-(N-isopropyl-N-methylamino)fluoran;

2-anilino-3-methyl-6-(N-isobutyl-N-methylamino)fluoran;

2-anilino-3-methyl-6-(N-n-amyl-N-methylamino)fluoran;

2-anilino-3-methyl-6-(N-sec-butyl-N-ethylamino)fluoran;

2-anilino-3-methyl-6-(N-n-amyl-N-ethylamino)fluoran;
2-anilino-3-methyl-6-(N-iso-amyl-N-ethylamino)fluoran;
2-anilino-3-methyl-6-(N-n-propyl-N-isopropylamino)-fluoran;
2-anilino-3-methyl-6-(N-cyclohexyl-N-methylamino)-fluoran;
2-anilino-3-methyl-6-(N-ethyl-p-toluidino)fluoran;
2-anilino-3-methyl-6-(N-methyl-p-toluidino)fluoran;
2-(m-trichloromethylanilino)-3-methyl-6-diethylamino-fluoran;
2-(m-trifluoromethylanilino)-3-methyl-6-diethylamino-fluoran;
2-(m-trifluoromethylanilino)-3-methyl-6-(N-cyclohexyl-N-methylamino)fluoran;
2-(2,4-dimethylanilino)-3-methyl-6-diethylaminofluoran;
2-(N-ethyl-p-toluidino)-3-methyl-6-(N-ethylanilino)fluoran;
2-(N-methyl-p-toluidino)-3-methyl-6-(N-propyl-p-toluidino) fluoran;
2-anilino-6-(N-n-hexyl-N-ethylamino)fluoran;
2-(o-chloroanilino)-6-diethylaminofluoran;
2-(o-bromoanilino)-6-diethylaminofluoran;
2-(o-chloroanilino)-6-dibutylaminofluoran;
2-(o-fluoroanilino)-6-dibutylaminofluoran;
2-(m-trifluoromethylanilino)-6-diethylaminofluoran;
2-(p-acetylanilino)-6-(N-n-amyl-N-n-butylamino)fluoran;
2-benzylamino-6-(N-ethyl-p-toluidino)fluoran;
2-benzylamino-6-(N-methyl-2,4-dimethylanilino) fluoran;
2-benzylamino-6-(N-ethyl-2,4-dimethylanilino)fluoran;
2-dibenzylamino-6-(N-methyl-p-toluidino)fluoran;
2-dibenzylamino-6-(N-ethyl-p-toluidino)fluoran;
2-(di-p-methylbenzylamino)-6-(N-ethyl-p-toluidino)fluoran;
2-(α-phenylethylamino)-6-(N-ethyl-p-toluidino)fluoran;
2-methylamino-6-(N-methylanilino)fluoran;
2-methylamino-6-(N-ethylanilino)fluoran;
2-methylamino-6-(N-propylanilino)fluoran;
2-ethylamino-6-(N-methyl-p-toluidino)fluoran;
2-methylamino-6-(N-methyl-2,4-dimethylanilino)fluoran;
2-ethylamino-6-(N-ethyl-2,4-dimethylanilino)fluoran;
2-dimethylamino-6-(N-methylanilino)fluoran;
2-dimethylamino-6-(N-ethylanilino)fluoran;
2-diethylamino-6-(N-methyl-p-toluidino)fluoran;
2-diethylamino-6-(N-ethyl-p-toluidino)fluoran;
2-dipropylamino-6-(N-methylanilino)fluoran;
2-dipropylamino-6-(N-ethylanilino)fluoran;
2-amino-6-(N-methylanilino)fluoran;
2-amino-6-(N-ethylanilino)fluoran;
2-amino-6-(N-propylanilino)fluoran;
2-amino-6-(N-methyl-p-toluidino)fluoran;
2-amino-6-(N-ethyl-p-toluidino)fluoran;
2-amino-6-(N-propyl-p-toluidino)fluoran;
2-amino-6-(N-methyl-p-ethylanilino)fluoran;
2-amino-6-(N-ethyl-p-ethylanilino)fluoran;
2-amino-6-(N-propyl-p-ethylanilino)fluoran;
2-amino-6-(N-methyl-2,4-dimethylanilino)fluoran;
2-amino-6-(N-ethyl-2,4-dimethylanilino)fluoran;
2-amino-6-(N-propyl-2,4-dimethylanilino)fluoran;
2-amino-6-(N-methyl-p-chloroanilino)fluoran;
2-amino-6-(N-ethyl-p-chloroanilino)fluoran;
2-amino-6-(N-propyl-p-chloroanilino)fluoran;
2,3-dimethyl-6-dimethylaminofluoran;
3-methyl-6-(N-ethyl-p-toluidino)fluoran;
2-chloro-6-diethylaminofluoran;
2-bromo-6-diethylaminofluoran;
2-chloro-6-dipropylaminofluoran;
3-chloro-6-cyclohexylaminofluoran;
3-bromo-6-cyclohexylaminofluoran;
2-chloro-6-(N-ethyl-N-isoamylamino)fluoran;
2-chloro-3-methyl-6-diethylaminofluoran;
2-anilino-3-chloro-6-diethylaminofluoran;
2-(o-chloroanilino)-3-chloro-6-cyclohexylaminofluoran;
2-(m-trifluoromethylanilino)-3-chloro-6-diethylamino-fluoran;
2-(2,3-dichloroanilino)-3-chloro-6-diethylaminofluoran;
1,2-benzo-6-diethylaminofluoran;
1,2-benzo-6-(N-ethyl-N-isoamylamino)fluoran;
1,2-benzo-6-dibutylaminofluoran;
1,2-benzo-6-(N-methyl-N-cyclohexylamino)fluoran;
1,2-benzo-6-(N-ethyltoluidino)fluoran.

Other leuco compounds that can be preferably used in the present invention are as follows:

2-anilino-3-methyl-6-(N-2-ethoxypropyl-N-ethylamino) fluoran;
2-(p-chloroanilino)-6-(N-n-octylamino)fluoran;
2-(p-chloroanilino)-6-(N-n-palmitylamino)fluoran;
2-(p-chloroanilino)-6-(di-n-octylamino)fluoran;
2-benzoylamino-6-(N-ethyl-p-toluidino)fluoran;
2-(o-methoxybenzoylamino)-6-(N-methyl-p-toluidino)-fluoran;
2-dibenzylamino-4-methyl-6-diethylaminofluoran;
2-dibenzylamino-4-methoxy-6-(N-methyl-p-toluidino)-fluoran;
2-benzylamino-4-methyl-6-(N-ethyl-p-toluidino)fluoran;
2-(α-phenylethylamino)-4-methyl-6-diethylaminofluoran;
2-(p-toluidino)-3-(t-butyl)-6-(N-methyl-p-toluidino)fluoran;
2-(o-methoxycarbonylanilino)-6-diethylaminofluoran;
2-acetylamino-6-(N-methyl-p-toluidino)fluoran;
2-diethylamino-6-(m-trifluromethylanilino)fluoran;
4-methoxy-6-(N-ethyl-p-toluidino)fluoran;
2-ethoxyethylamino-3-chloro-6-dibutylaminofluoran;
2-dibenzylamino-4-chloro-6-(N-ethyl-p-toluidino)fluoran;
2-(α-phenylethylamino)-4-chloro-6-diethylaminofluoran;
2-(N-benzyl-p-trifluoromethylanilino)-4-chloro-6-diethylaminofluoran;
2-anilino-3-methyl-6-pyrrolidinofluoran;
2-anilino-3-chloro-6-pyrrolidinofluoran;
2-anilino-3-methyl-6-(N-ethyl-N-tetrahydrofurfurylamino)fluoran;
2-mesidino-4',5'-benzo-6-diethylaminofluoran;

2-(m-trifluoromethylanilino)-3-methyl-6-pyrrolidinofluoran;

2-(α-naphthylamino)-3,4-benzo-4'-bromo-6-(N-benzyl-N-cyclohexylamino)fluoran;

2-piperidino-6-diethylaminofluoran;

2-(N-n-propyl-p-trifluoromethylanilino)-6-morpholinofluoran;

2-(di-N-p-chlorophenyl-methylamino)-6-pyrrolidinofluorane;

2-(N-n-propyl-m-trifluoromethylanilino)-6-morpholinofluoran;

1,2-benzo-6-(N-ethyl-N-n-octylamino)fluoran;

1,2-benzo-6-diallylaminofluoran;

1,2-benzo-6-(N-ethoxyethyl-N-n-ethylamino)fluoran;

benzoleuco methylene blue

2-[3,6-bis(diethylamino)]-6-(o-chloroanilino)xanthyl benzoic acid lactam;

2-[3,6-bis(diethylamino)]-9-(o-chloroanilino)xanthyl benzoic acid lactam;

3,3-bis(p-dimethylaminophenyl)phthalide;

3,3-bis(p-dimethylaminophenyl)-6-dimethylaminophthalide (another name: crystal violet lactone);

3,3-bis(p-dimethylaminophenyl)-6-diethylaminophthalide;

3,3-bis(p-dimethylaminophenyl)-6-chlorophthalide;

3,3-bis(p-dibutylaminophenyl)phthalide;

3-(2-methoxy-4-dimethylaminophenyl)-3-(2-hydroxy-4,5-dichlorophenyl)phthalide;

3-(2-hydroxy-4-dimethylaminophenyl)-3-(2-methoxy-5-chlorophenyl)phthalide;

3-(2-hydroxy-4-dimethoxyaminophenyl)-3-(2-methoxy-5-chlorophenyl)phthalide;

3-(2-hydroxy-4-dimethylaminophenyl)-3-(2-methoxy-5-nitrophenyl)phthalide;

3-(2-hydroxy-4-diethylaminophenyl)-3-(2-methoxy-5-methylphenyl)phthalide;

3-(2-methoxy-4-dimethylaminophenyl)-3-(2-hydroxy-4-chloro-5-methoxyphenyl)phthalide;

3,6-bis(dimethylamino)fluorene spiro(9,3')-6'-dimethylaminophthalide;

6'-chloro-8'-methoxy-benzoindolino-spiropyran;

6'-bromo-8'-methoxy-benzoindolino-spiropyran.

The amount ratio of the acidic substance to the leuco compound should be determined in accordance with the nature of the compounds used in the composition. The amount ratio is generally in the range of from 1 to 20 moles, preferably 2 to 10 moles, of said acidic substance per one mole of the leuco compound. When the amount ratio of the acidic substance to the leuco compound is out of the above range, sufficient color density cannot be obtained.

The amount ratio of the acidic substance to the basic substance, which characterizes the present invention, is as follows. As mentioned above, said acidic substance is used in a greater amount than the amount equivalent to said basic substance. Alternatively, an additional amount of the acidic substance is added to the salt or complex salt obtained by the reaction of said acidic substance with an equivalent amount of said basic substance. When said acidic substance is mixed with an equivalent amount of said basic substance, sufficient color density cannot be obtained. While, more than one fifth of the basic substance, based on the amount equivalent to said acidic substance, is preferably used since the decoloring is insufficient when the amount of said basic substance is too small.

While the composition of the present invention essentially comprises the leuco compound, the salt or complex salt of the acidic substance and the basic substance, and the acidic substance, an additive having an effect of controlling the structure of the arranged molecules can be incorporated for the purpose of improving various properties, e.g., the decoloring property or the coloring stability.

The present invention also relates to a reversible thermal recording medium comprising the above composition in its recording layer. Said recording layer comprising said reversible thermal coloring composition and a binder resin is formed on a support to obtain said recording medium. Said recording layer preferably has a thickness of 5 to 15 μm. A paper, a synthetic paper, a plastic sheet, a glass plate and a metal sheet can be used as the support depending on the purpose of said recording medium.

Any recording layers can be used so far as they comprise said reversible thermal coloring composition. As commonly practiced, said reversible thermal coloring composition can be retained on the support in the form of a layer by using a binder resin, if necessary. The binder resin includes, for example, polyvinyl chloride, polyvinyl acetate, vinyl chloride-vinyl acetate copolymer, polystyrene, styrene copolymer, phenoxy resin, polyester, aromatic polyester, polyurethane, polycarbonate, poly(meth) acrylates. The role of the binder resin is to maintain stably the reversible thermal coloring composition distributed in said recording layer so as to prevent the recording layer from changing its properties upon repeated coloring and decoloring processes. The binder resin preferably has high thermal resistance so as to prevent the composition from gathering heterogeneously upon heating. Additionally, the reversible thermal coloring composition can be encapsulated in a microcapsule and incorporated into the recording layer.

The recording layer can be formed in accordance with any conventional method, e.g., by applying to said support a homogeneous dispersion or solution of the reversible coloring composition and said binder resin in water or an organic solvent followed by drying. A protection layer is preferably provided on said recording layer. A conventional material such as a thermoplastic resin, a thermosetting resin, an ultraviolet-curable resin or an electron beam-curable resin can be used as the material of said protection layer.

The reversible recording medium of the present invention is characterized in that it has a decoloring temperature range higher than the coloring temperature range and consequently, an image can be reversibly formed on said recording medium by a recording process comprising a coloring step wherein said recording medium is heated for a short time at a temperature within said coloring temperature range and a decoloring step wherein said recording medium is heated for a short time at a decoloring temperature which is higher than the coloring temperature.

A method for applying heat to said reversible recording medium to form or erase an image can be selected from conventional methods for applying heat. A thermal pen, a thermal head or a laser beam which can apply heat to a part of the medium may be used for applying heat to form an image. Alternatively, heat can be applied to the entire surface of said reversible recording medium with a heated roller or a hot stamping press.

The recording medium of the present invention can be decolored by heating it for a short time followed by rapidly cooling and therefore, a part of the surface of said recording medium can be decolored to obtain an image by means of a thermal head, which is generally accompanied with rapid cooling. Consequently, a negative image can be easily formed on said recording medium by heating the entire surface of said medium with a heated roll and then applying heat imagewise with a thermal head to a part of said surface.

According to the present invention, there can be obtained a reversible thermal coloring composition wherein coloring and decoloring can be easily carried out simply by controlling the temperature at which said composition is heated and both the colored state and the decolored state can be firmly maintained at room temperature. By the use of said composition, a reversible recording medium having an excellent durability upon repeated coloring and decoloring can be obtained. Further, said recording medium has especially an excellent decoloring rate and owing to said rapid decoloring rate, various types of images, including negative images, which have not been able to be obtained with any conventional recording medium, can be obtained.

EXAMPLES

The present invention is further explained by the following examples, which are not intended to limit the scope of the present invention. "Parts"in the following examples mean parts by weight.

Example 1

The reversible thermal coloring composition of the present invention was prepared by thoroughly grinding and mixing the following compounds:

| | |
|---|---|
| 2-anilino-3-methyl-6-diethylamino fluoran | 6.5 parts (molar ratio:1) |
| eicosyl thiomalic acid | 30.1 parts (molar ratio:5) |
| octadecyl amine | 15.1 parts (molar ratio:4) |

The above mixture was placed on a cover glass heated at 170° C. on a hot plate to melt. Then, another glass was placed thereon to spread out the molten mixture therebetween. Subsequently, the lower surface of said cover glass was rapidly cooled with water at 1° C. At this time, the mixture in the form of a membrane had no color. Then, said cover glass was placed on a hot plate heated at 74° C. and the color of the mixture changed to dark green. The mixture remained in the colored state even after separated from said hot plate and cooled to room temperature. The color of the colored composition was removed when being put on a hot plate kept at 120° C. and the decolored state was maintained when being rapidly cooled to room temperature.

Said composition could be stably kept either in the colored or decolored state at room temperature for a long period.

Example 2

A coating dispersion for forming a recording layer having the following composition was prepared:

| | |
|---|---|
| 2-anilino-3-methyl-6-diethylamino fluoran | 6.5 parts (molar ratio:1) |
| eicosyl thiomalic acid | 30.1 parts (molar ratio:5) |
| octadecyl amine | 15.1 parts (molar ratio:4) |
| vinyl chloride-vinyl acetate copolymer | 43.3 parts |
| tetrahydrofuran | 600 parts |

The above ingredients were mixed and then thoroughly ground and dispersed with a ball mill. The resultant dispersion was applied to a white polyester film and subsequently dried at 110° C. for 5 minutes to obtain a reversible thermal recording medium of the invention. The resultant recording medium was colorless in the decolored state.

Figure 2:
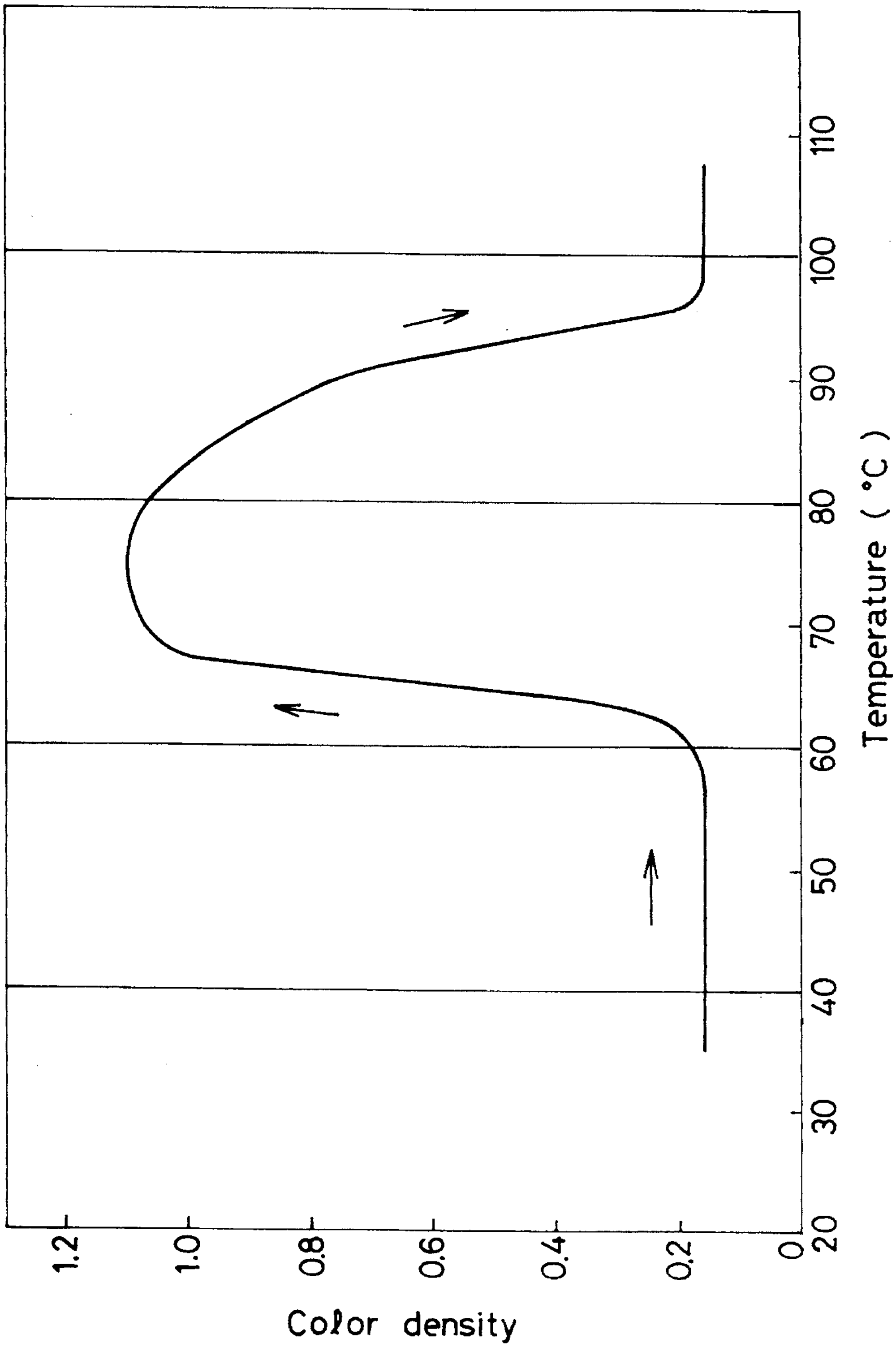
FIG. 2 is a diagram showing the relation between the reflection density of a recording medium comprising the reversible thermal coloring composition of the invention and the thermal treatment temperature of said recording medium.

The recording medium was heated on a hot plate at a given temperature for 10 seconds and allowed to cool to room temperature. The color density of said recording medium was then measured. The result is shown in FIG. 2. As shown clearly in the figure, the color density of the recording medium increased rapidly at a temperature of about 65° C. Upon treating at a higher temperature, the color density of the recording medium began to decrease at a temperature of 85° to 95° C. and the recording medium treated at a temperature of 100° C. or more was in a completely decolored state.

The entire surface of the recording medium was heated at 75° C. with a heated roller to dark green. The color density of said surface was 1.10. Subsequently, letters were printed on said surface at an energy density of 70 $mJ/mm^2$ with a thermal simulator. The parts of the recording medium corresponding to the printed letters were completely decolored and had a color density of 0.16. White letters were clearly printed on the dark green background when printed on the recording medium by using a thermal head printer attached to a conventional word processor.

What is claimed is:

1. A reversible thermal coloring composition comprising (1) a leuco compound, (2) a salt or complex salt of an acidic substance A with a basic substance, and (3) an acidic substance B, wherein the acidic substance A is identical with the acidic substance B.

2. The reversible thermal coloring composition of claim 1, wherein the acidic substance has an alkyl group having 10 or more carbon atoms.

3. The reversible thermal coloring composition of claim 1 or 2, wherein the acidic substance is a polybasic acid having two or more carboxyl groups.

4. The reversible thermal coloring composition of claim 1 or 2, wherein the basic substance has an alkyl group having 10 or more carbon atoms and an amino group.

5. The reversible thermal coloring composition of claim 3, wherein the basic substance has an alkyl group having 10 or more carbon atoms and an amino group.

6. A recording medium having a recording layer on a support wherein the recording layer comprises the reversible thermal coloring composition of any one of claims 1 to 5 and a binder resin.

7. A method for reversible recording comprising a coloring step wherein the recording medium of claim 6 is heated at a temperature within the coloring temperature range of said reversible thermal coloring composition, which is lower than its decoloring temperature, and a decoloring step wherein said recording medium is heated at a temperature higher than said coloring temperature range.

8. A method for reversible recording comprising a coloring step wherein the whole surface of the recording medium of claim 6 is heated at a coloring temperature of the reversible thermal coloring composition, and a decoloring step wherein a part of the surface of said recording medium is imagewise heated at a temperature within the decoloring temperature range of said coloring composition, which is lower than the coloring temperature, and then cooled rapidly.

* * * * *